(12) United States Patent
Barr

(10) Patent No.: US 8,693,419 B2
(45) Date of Patent: Apr. 8, 2014

(54) METHOD AND APPARATUS FOR USING DYNAMIC SUBCHANNELS IN A COMMUNICATIONS NETWORK

(75) Inventor: David Barr, San Jose, CA (US)

(73) Assignee: Entropic Communications, Inc., San Diego, CA (US)

(*) Notice: Subject to any disclaimer, the term of this patent is extended or adjusted under 35 U.S.C. 154(b) by 215 days.

(21) Appl. No.: 13/179,843

(22) Filed: Jul. 11, 2011

(65) Prior Publication Data

US 2012/0008640 A1     Jan. 12, 2012

Related U.S. Application Data

(60) Provisional application No. 61/363,442, filed on Jul. 12, 2010.

(51) Int. Cl.
*H04J 1/00* (2006.01)
*H04W 4/00* (2009.01)

(52) U.S. Cl.
USPC .......................................... 370/329; 370/341

(58) Field of Classification Search
None
See application file for complete search history.

(56) References Cited

U.S. PATENT DOCUMENTS

| | | | |
|---|---|---|---|
| 7,486,735 B2 | 2/2009 | Dubuc et al. | |
| 7,522,637 B2 | 4/2009 | Kim et al. | |
| 2006/0094363 A1* | 5/2006 | Kang et al. | 455/63.1 |
| 2006/0120395 A1* | 6/2006 | Xing et al. | 370/431 |
| 2008/0089278 A1* | 4/2008 | Chang et al. | 370/329 |
| 2008/0095223 A1 | 4/2008 | Tong et al. | |
| 2008/0113624 A1 | 5/2008 | Seidel et al. | |
| 2008/0159366 A1* | 7/2008 | Tzannes et al. | 375/219 |
| 2008/0232320 A1* | 9/2008 | Lee et al. | 370/329 |
| 2008/0287138 A1 | 11/2008 | Yoon et al. | |

* cited by examiner

*Primary Examiner* — Chi Pham
*Assistant Examiner* — Soon-Dong D Hyun
(74) *Attorney, Agent, or Firm* — Bruce Greenhaus; Richard Bachand

(57) ABSTRACT

A method and apparatus for attaining the benefits of both an adjacent subchannel assignments and distributed subchannel assignments. That is, the following is a method and apparatus for providing dynamic subchannel assignments that provide the benefits of both adjacent subchannel assignments and distributed subchannel assignments.

13 Claims, 3 Drawing Sheets

≡ Subcarrier undergoing Link Maintenance Operation
• EVM Probe, Rx-Determined Probe, Silent Probe,...

METHOD AND APPARATUS FOR USING DYNAMIC SUBCHANNELS IN A COMMUNICATIONS NETWORK

CROSS REFERENCE TO RELATED APPLICATIONS

This application claims the benefit of co-pending U.S. Provisional Application No. 61/363,442 filed Jul. 12, 2010.

TECHNICAL FIELD

The disclosed method and apparatus relates to communications networks, and more particularly, some embodiments relate to a means for allocating subcarriers at the physical layer of an orthogonal frequency multiplexing (OFDM) network node.

DESCRIPTION OF THE RELATED ART

In communications networks that use an orthogonal frequency division multiple access (OFDMA) modulation scheme, a plurality of subcarriers are defined. Each subcarrier can be assigned to carry information between any of a plurality of devices in the network. It is common for a network controller to grant requests for upstream bursts to a headend (i.e., bursts of data sent from a node of the network to the headend). In some such cases, such requests specify which subcarriers are to be used by each OFDMA transmitter. In some such cases, the headend can pre-define which subcarriers are to be used. Predefining subsets of subcarriers simplifies the granting of upstream bursts. Accordingly, the headend will transmit these assignments of predefined subsets through downstream broadcasts to the nodes of the network. The assignments indicate how subchannels will be used by each node in such upstream communications from each node to the headend.

In one case, each subchannel is assigned a set (or groups) of adjacent subcarriers from among the subcarriers within the OFDM (orthogonal frequency division multiplexing) channel. FIG. 1 shows adjacent subcarriers assigned to each subchannel. Alternatively, the subcarriers assigned to each subchannel may be scattered throughout the OFDM channel. FIG. 2 shows an example of the subcarriers of each subchannel distributed throughout the channel. Adjacent subchannels provide better channel coherence within subchannels. However, distributed subchannels provide better frequency diversity within subchannels. Nonetheless, there is a tradeoff and the benefits of both of these schemes cannot be realized, if only one or the other scheme must be selected.

Networks that operate in accordance with a well-known communications standard promulgated by MoCA (the multimedia over Coax Alliance) regularly schedule channel assessment probes that occupy full symbols (i.e., every subcarrier). These MoCA networks have relatively short (5 usec duration) symbols, and supports only 16 nodes. In contrast, networks commonly referred to as "Access" networks are likely to have longer symbols (~25 usec duration), and support up to 256 nodes. Due to the higher number of nodes, and longer symbol period, a full link-maintenance cycle will consume much more channel time to complete in such an Access network. Also, Access networks may utilize OFDMA transmission over subchannels. These subchannels are typically defined as relatively "static" subsets of the subcarriers. To perform link maintenance on every subcarrier, probe transmissions would have to be scheduled on all subchannels, either:

a) simultaneously, pausing all other traffic for the duration of the probe(s); or,
b) sequentially, burdening the scheduler to schedule probes that sequence through all the subchannels.

SUMMARY OF DISCLOSED METHOD AND APPARATUS

The following presents a simplified summary of one or more embodiments in order to provide a basic understanding of some aspects of such embodiments. This summary is not an extensive overview of the one or more embodiments, and is intended to neither identify key or critical elements of the embodiments, nor delineate the scope of such embodiments. Its sole purpose is to present some concepts of the described embodiments in a simplified form as a prelude to the more detailed description that is presented later.

This disclosure provides a method and apparatus for attaining the combined benefits of both an adjacent subchannel assignments and distributed subchannel assignments. That is, the following is a method and apparatus for providing dynamic subchannel assignments that provide the benefits of both adjacent subchannel assignments and distributed subchannel assignments.

In addition, the disclosed method and apparatus allows the probing sequence to be distributed in time and frequency, thereby reducing the impact on ongoing traffic.

In order to minimize the disruption to network traffic, and to minimize the burden on the scheduler, a Dynamic Subchannel is defined using physical subcarriers that automatically sequence their position, moving through some of the band or the entire band.

In one embodiment, the sequencing of the subcarrier position can be handled at the PHY-layer (physical layer), thus unburdening the scheduler. The scheduler schedules the probe on a Dynamic Subchannel, and the PHY-layers manage the automatic sequencing. This approach helps keep the link maintenance operation as a background network process. This approach also enables reduced preamble techniques.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

Figure 1:
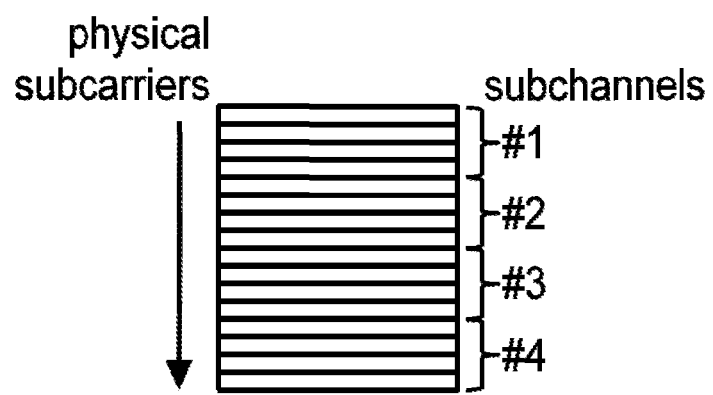
FIG. 1 shows adjacent subcarriers assigned to each subchannel
Figure 2:
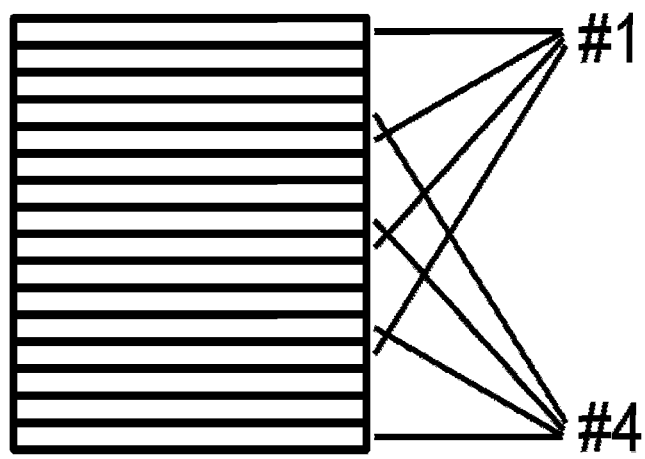
FIG. 2 shows the subcarriers of each subchannel distributed throughout the channel.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The disclosed method and apparatus provides dynamic subchannel assignments that provide the benefits of both adjacent subchannel assignments and distributed subchannel assignments.

In accordance with one embodiment of the disclosed method and apparatus, the component physical subcarriers of subchannels of an OFDMA (orthogonal frequency division multiple access) modulated communication are neither fixed nor semi-stationary. Rather, the subcarriers permute with other subcarriers. That is, the particular grouping of the subcarriers into subchannels dynamically changes, for example, with substitutions from symbol-to-symbol, or from burst-to-burst. The subchannels that result from changing subchannel definitions in this way are referred to herein as "dynamic subchannels". The PHY-layer (i.e., physical layer) permutation & substitution of subcarriers reduces the complexity of the MAC (media access control) scheduling.

In addition, the use of dynamic subchannels provides additional diversity in the frequency domain. Furthermore, if subchannel coherence from adjacent subcarriers is needed, then the benefits of both adjacent subchannels and distributed subchannels can be attained: i.e., both subchannel coherence and frequency diversity can be attained.

Dynamic subchannels can periodically utilize every subcarrier. In addition, receivers on the network can observe a channel estimate for all subcarriers and from all of the transmitters within the network. Receivers can track semi-stationary coax components that make up the total channel estimate. The use of dynamic subchannels also enables reduced preamble techniques.

In embodiments of the disclosed method and apparatus in which LMOs (Link Maintenance Operation) are used, such as in networks that adhere to the MoCA (Multimedia over Coax Alliance) standard for operating a home entertainment communications network, the LMO should monitor all used subcarriers. That is, the channel assessment probes (error vector magnitude (EVM) probes, receiver determined probes and silent probes) should be used to determine the channel characteristics for each subcarrier that is being used by any subchannel. Receiver determined probes are transmissions in which the device that will be receiving the probe determines the nature of the probe. Silent probes are periods during which a subcarrier remains silent (i.e., on the subcarrier remains unmodulated).

Some networks in accordance with the disclosed method and apparatus use a model that includes upstream bursts and downstream broadcast traffic. In such embodiments, all modems (e.g., the modems in the CPE nodes of the network) can monitor the same transmissions from the Headend. On the upstream, the headend needs to monitor transmissions from every modem. Accordingly, the upstream link maintenance will occupy up to 256 times more channel time. Probes are typically scheduled on all subcarriers (occupying the entire band). However, this pauses traffic network-wide. Therefore, in accordance with the presently disclosed method and apparatus, probes can be scheduled on Dynamic Subchannels. Subchannels are used in which subcarriers are automatically sequenced through the entire band. Subcarriers that are moving take precedence over (i.e., borrow from or swap with) other subcarriers. Periodic probes ensure periodic coverage of all subcarriers (i.e., feedback regarding the characteristics of each of the subcarriers). This process then maintains the entire band, distributed in time & frequency at the PHY-layer (physical layer), without pausing traffic.

Figure 3:
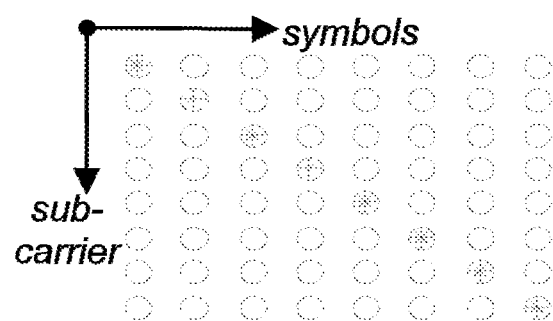
FIG. 3 shows how subcarriers that are assigned to a subchannel are changed dynamically in order to allow link maintenance upon each subcarrier in its turn.

Subcarriers periodically change position in a pre-determined pattern, eventually covering most of the band. Alternatively, the pattern covers all of the band. FIG. 3 shows one such pattern in which subcarriers are assigned to a subchannel dynamically in order to allow link maintenance upon each subcarrier in its turn. In the embodiment shown in FIG. 3, each subcarrier is in-turn assigned to the subchannel that is performing link maintenance. Accordingly, the particular subcarrier on which probes are sent changes as the subcarriers are assigned into and out of the dynamic subchannel performing link maintenance. The pattern can be regular, irregular or even pseudo-random. In one such example, in which subcarrier pitch is N and a repetition factor is M, a dynamic subchannel co-opts every Nth subcarrier. The particular subcarrier that is co-opted (or occupied) increments in position every M symbols. That is, after M symbols have been transmitted on that subcarrier, the probe transmission is shifted to the next subcarrier(s) for another M symbols, and so on. The subcarriers are sequenced only when the dynamic subchannel receives a grant. In addition, notched subcarriers, if any, when passed, are not transmitted (i.e., are skipped). In this example, every subcarrier (the entire band) is covered in N×M symbols. The headend can schedule each modem (i.e., node of the network) to transmit a probe of this duration or some multiple of this duration. Grants can be disjoint in time. That is, there is no need for grants to be contiguous in time. In one example, there are ≤256 modems (e.g., nodes in the network)×(Pitch=64)×(M=1)≤8 k symbols≤~330 msecs (i.e., duration of a complete link maintenance cycle).

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of allocating subcarriers to subchannels in a communications network comprising:
   a) establishing at least one dynamic subchannel to which subcarriers can be dynamically assigned;
   b) performing link maintenance operations on at least one dynamic subchannel, wherein the link maintenance operations including restricting transmission of probes to the subcarriers of the dynamic subchannel; and
   c) switching which of the subcarriers make up the at least one dynamic subchannel periodically in order to ensure that link maintenance operations are performed on additional subcarriers over time.

2. The method of claim 1, wherein switching of the subcarriers occurs from symbol to symbol.

3. The method of claim 1, wherein switching of the subcarriers occurs from burst to burst.

4. The method of claim 1, wherein switching of the subcarriers is performed at the physical layer.

5. The method of claim 1, wherein the communications network includes receivers and transmitters and performing the link maintenance operations over time allows each receiver within the communications network to observe a channel estimate for all subcarriers and from all of the transmitters of the communications network.

6. The method of claim 1, wherein the link maintenance operations sends the probes to all of the subcarriers used by the communications network by virtue of having all of the subcarriers included within the dynamic subchannel at one time or another.

7. The method of claim 6, wherein the probes include channel assessment probes on the subcarriers of the dynamic subchannel.

8. The method of claim 7, wherein the channel assessment probes include error vector magnitude probes.

9. The method of claim 7, wherein the channel assessment probes include receiver determined probes.

10. The method of claim 7, wherein the channel assessment probes include silent probes.

11. The method of claim 1, wherein the switching of the subcarriers occurs in accordance with a predetermined pattern.

12. The method of claim 11, wherein the predetermined pattern ensures that most of the subcarriers are characterized by the link maintenance operations.

13. The method of claim 11, wherein the predetermined pattern ensures that all of the subcarriers are characterized by the link maintenance operations.

* * * * *